March 6, 1928. 1,661,985

C. WILSON

CULTIVATOR ATTACHMENT

Filed Nov. 3, 1926 2 Sheets-Sheet 1

Carl Wilson INVENTOR

BY Victor J. Evans ATTORNEY

WITNESS: J. T. L. Wright

March 6, 1928.  
C. WILSON  
CULTIVATOR ATTACHMENT  
Filed Nov. 3, 1926
1,661,985
2 Sheets-Sheet 2
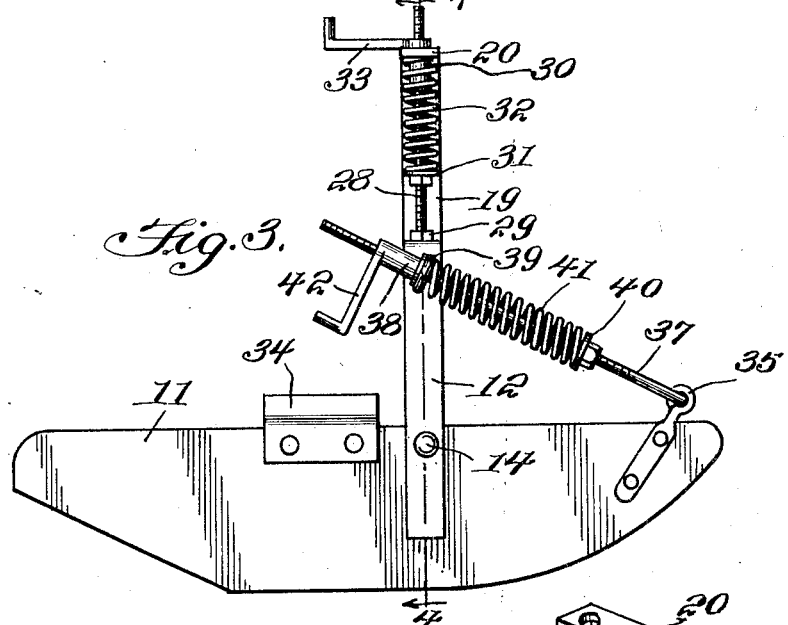
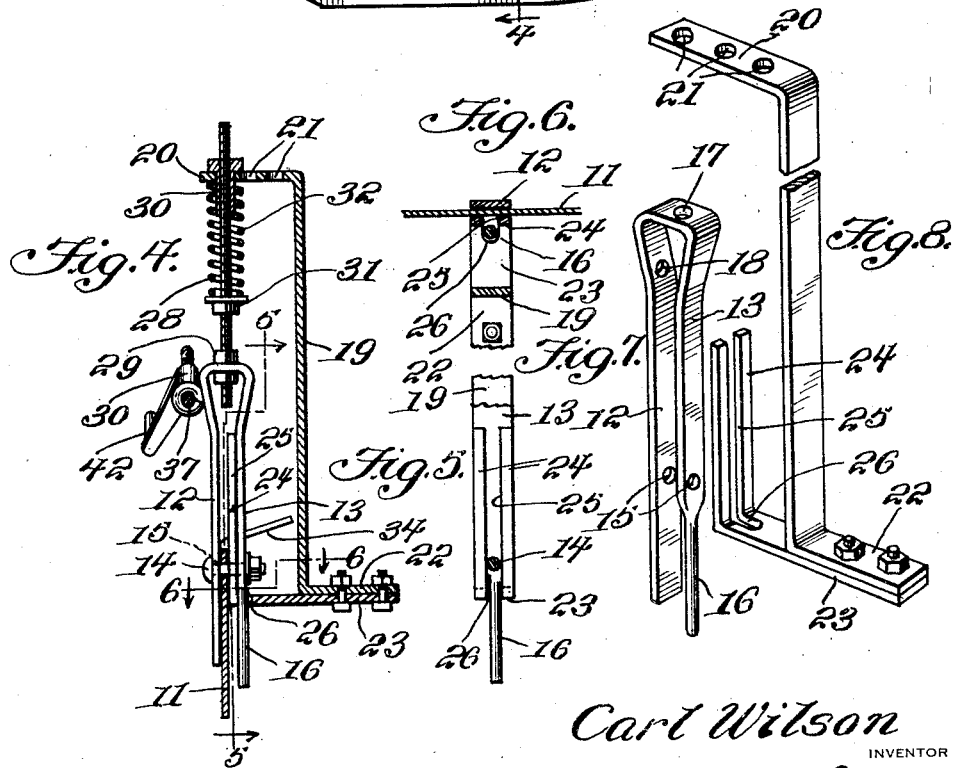
Carl Wilson
INVENTOR
BY Victor J. Evans
ATTORNEY
WITNESS: J. T. L. Wright Patented Mar. 6, 1928.

1,661,985

UNITED STATES PATENT OFFICE.

CARL WILSON, OF CHILLICOTHE, OHIO.

CULTIVATOR ATTACHMENT.

Application filed November 3, 1926. Serial No. 146,020.

This invention comprehends the provision of a cultivator attachment in the nature of a plant protector constructed to be arranged in close proximity to the opposed sides of the plant row, thereby making it possible to start cultivating approximately ten days sooner than otherwise, as the plants are fully protected from being covered while cultivating.

In carrying out the invention I contemplate the use of companion shields adapted to be arranged at the opposite sides of the plant row, and yieldably supported for both vertical sliding and pivotal movements, should the shields be brought into contact with clods of dirt, stones or other obstructions.

Another object of the invention resides in the provision of means whereby the shields can be conveniently adjusted at the proper angle with relation to the ground.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 3 is a sectional view on line 3—3 of Figure 2.

Figure 4 is a sectional view on line 4—4 of Figure 3.

Figure 5 is a sectional view on line 5—5 of Figure 4.

Figure 6 is a sectional view on line 6—6 of Figure 4.

Figure 7 is a perspective view of the bracket used in connection with each shield.

Figure 8 is a view of the support upon which the bracket in Figure 7 is mounted.

Figure 1:
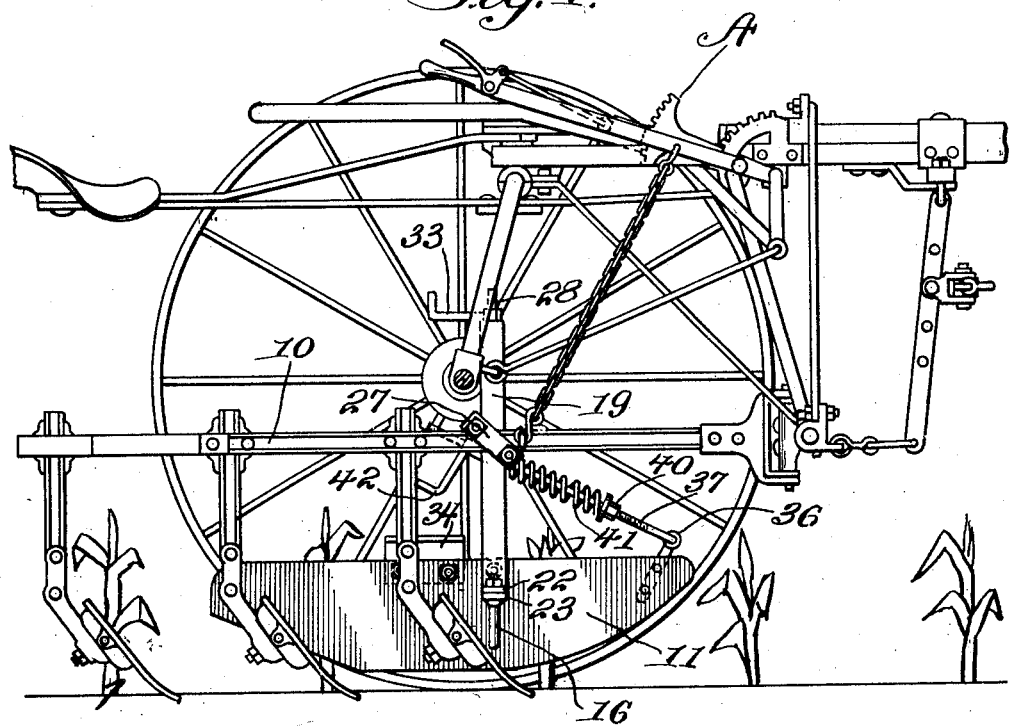
Figure 1 is a side elevation of a cultivator with one wheel removed showing the application of the invention.

Referring to the drawings in detail A indicates a cultivator of well known construction, and wherein the plow beams are indicated at 10. The attachment forming the subject matter of the present invention is clearly illustrated in Figures 3 to 8 inclusive, and is adapted to be mounted on the plow beams 10 as illustrated in Figures 1 and 2.

Figure 2:
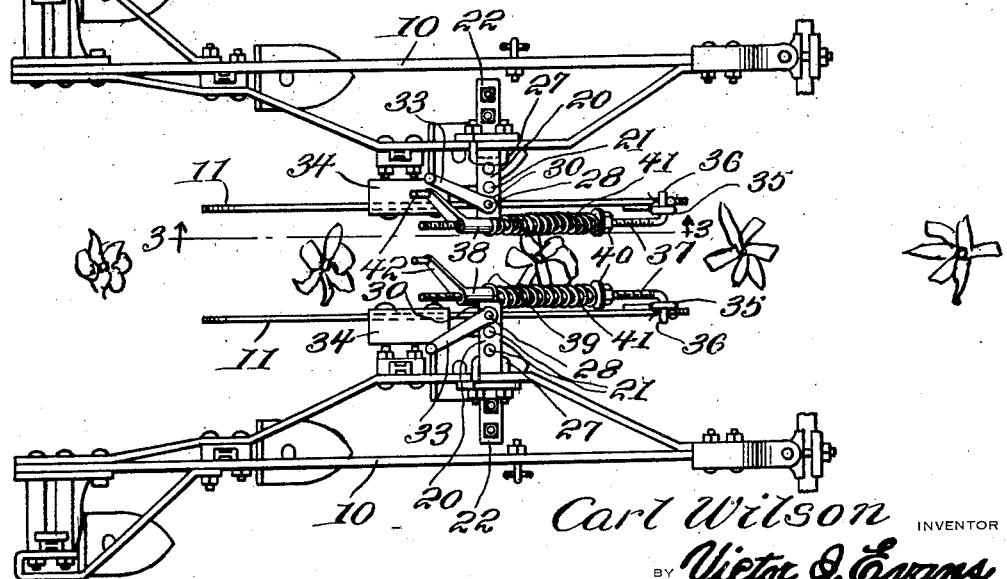
Figure 2 is a top plan view.

The attachment embodies companion shields 11 which are in the nature of elongated plates disposed edgewise at the opposite sides of the plant row as illustrated in Figure 2, and these shields are adapted to be arranged in close proximity to said row to prevent the plants from being covered under any circumstances while being cultivated. This permits the farmer to start to cultivate from a week to ten days sooner than otherwise, as the plants are fully protected in the manner stated. Each plate is arranged between the limbs 12 and 13 of an inverted U-shaped bracket clearly illustrated in Figure 7, and pivotally supported thereon by a pivot bolt 14 adapted to pass through an opening in the shield, and also through aligned openings 15 in the limbs of the bracket. It will be noted upon inspection of Figure 7 that the limb 13 is rounded at its lower end as at 16, and this rouned portion is adapted to project an appreciable distance below the corresponding end of the limb 12. The purpose for this arrangement will be presently described. The closed end of the bracket is provided with a central opening 17, while the limb 12 is provided with a similar opening 18 adjacent the upper end thereof. This bracket is mounted for yielding movements in a vertical plane, to permit the shield 11 to give when brought into contact with stones or other obstructions during its course of travel over the ground, and for this purpose I preferably make use of the structure illustrated in Figure 8.

In this Figure I have shown a substantially Z-shaped standard, the vertical or intermediate portion of which is indicated at 19, while the upper extremity 20 is provided with a pluraltiy of openings 21 adapted to be selectively aligned with the opening 17 in the bracket above described. The other extremity 22 of the standard is adapted to be bolted or otherwise secured to the horizontal portion 23 of a substantially L-shaped member, the vertical portion of which is slotted as at 25, and which slot extends a short distance into the horizontal portion 23 as indicated at 26. There is one of these standards for each bracket and shield, and each standard is clamped in any suitable manner to the adjacent cultivator beam 10 as at 27. The vertical portion 24 of the L-shaped member is arranged between the limbs 12 and 13 of the bracket, and the pivot bolt 14 for the shield passes through the slot 25, thereby permitting the bracket and shield to move vertically in said slot. A rod 28 is passed through the opening 17 in the bracket and through one of the openings 21 in the upper end of the standard 19, the rod being connected with the bracket by means 29 as clearly illustrated in Figure 4. Surrounding the upper end of the rod is a sleeve-like member 30 which passes through the particular opening 21 in the standard, while adjustably mounted on the rod 28 is a nut and washer indicated at 31. Surrounding this rod is a coil spring 32, one end of which bears against the upper end of the standard, while the other end rests against the nut 31. This construction allows the shield 11 to yield vertically under the conditions above mentioned. Projecting from the sleeve 30 is a small lever or handle 33 utilized to adjust the tension of the spring 32 as the occasion may require. The long rounded portion 16 of the bracket slides through the portion 26 of the slot 25, and serves to guide the bracket in its yielding movements, and to prevent the bracket from becoming separated from its support. Each shield is also provided with a foot engaging plate 34.

Each shield is also allowed pivotal movement when brought into contact with a stone or other obstruction, while each shield is also susceptible of adjustment on its pivot so that it can be arranged at the proper angle with relation to the ground. For this purpose the forward end of each shield is provided with an eye 35 which receives the offset extremity 36 of a rod 37, the latter being threaded through a sleeve-like member 38 supported by an eye 39 associated with the opening 18 of the limb 12 of the bracket. The rod 37 also supports a nut and washer 40 against which bears one end of a coil spring 41, the latter surrounding the rod 37 and also bearing against the eye 39. This spring permits the shield yielding pivotal movement, while the sleeve 38 can be rotated by the handle 42 to adjust the shield upon its pivot 14 and also to regulate the tension of the spring 41.

While it is believed that from the foregoing description, the nature and advantages of the invention will be readily apparent, I desire to have it understood that I do not limit myself to what is herein shown and described and that such changes may be resorted to when desired as fall within the scope of what is claimed.

What is claimed is:

1. A plant protector for cultivators comprising companion shields, adapted to be arranged at the opposite sides of the plant row, a standard for each shield adapted to clamp to the adjacent cultivator beam, a substantially U-shaped bracket pivotally supporting each shield and yieldably mounted for sliding movement on said standard, and means for adjusting each shield pivotally with relation to the ground, and yieldably supporting the shield for pivotal movement.

2. A plant protector for cultivators comprising companion shields adapted to be arranged at the opposite sides of a plant row, a standard for each shield adapted to be clamped to the adjacent cultivator beam, a bracket pivotally supporting each shield and yieldably mounted for sliding movement on the standard, a rod pivotally connected with the forward end of each shield and mounted for sliding movement with relation to said brackets, means associated with said rod for adjusting each shield pivotally with relation to the ground, and means surrounding said rod for yieldably supporting the shields for pivotal movement.

3. A plant protector for cultivators comprising companion shields adapted to be arranged at the opposite sides of the plant row, a standard for each shield adapted to be clamped to the adjacent cultivator beam, and including an offset bifurcated portion, a bracket slidably mounted on said bifurcated portion and pivotally supporting each shield, a yieldable connection between the upper end of the standard and said bracket, whereby the latter is yieldably supported, and means supported by said bracket for adjusting the shields pivotally with relation to the ground and yieldably supporting the shield for pivotal movement.

In testimony whereof I affix my signature.

CARL WILSON.